Patented Apr. 20, 1954

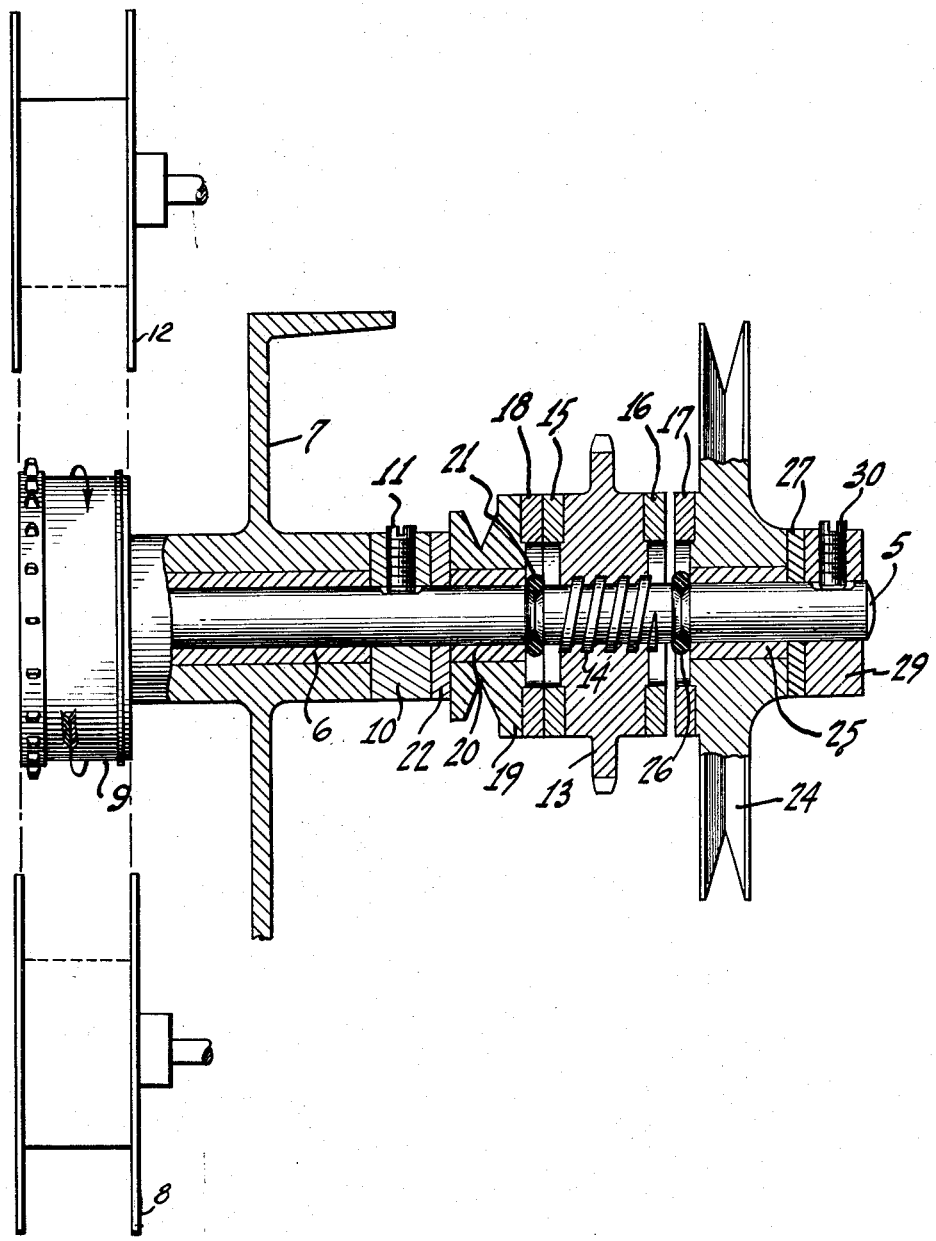

2,675,974

UNITED STATES PATENT OFFICE 2,675,974

FILM TAKE-UP AND REWIND DRIVE MECHANISM

Alan S. Jones, Palmyra, N. J., assignor to Radio Corporation of America, a corporation of Delaware Application August 31, 1950, Serial No. 182,479

5 Claims. (Cl. 242—55)

This invention relates to motion picture apparatus, and particularly to a film take-up and film rewind drive mechanism.

Many types of film rewinding spindle mechanisms have been used. In practically all types, the rewinding of the film is done at a more rapid rate than the advancement of the film during projection, and it is usually necessary to change belts or manipulate parts of the spindles in order to accomplish the rewinding operation when the projector is reversed. The present invention is a drive mechanism both for advancing the film and for automatically shifting the spindle drive from the take-up reel to the supply reel. The increased speed of rewind is also accomplished automatically. The only action to be taken by the operator is to reverse the projector.

The principal object of the invention, therefore, is to provide an improved film advancing, film take-up, and film rewind drive mechanism.

Another object of the invention is to provide an improved take-up and rewind drive spindle.

A further object of the invention is to provide an improved combination film sprocket, takeup, and rewind drive mechanism which automatically shifts the drive from take-up to rewind pulleys upon reversal of the drive mechanism.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which the single figure is a cross-sectional view of the spindle with its film advancing sprocket and the drive pulleys for the reels.

Referring now to the drawing, the main drive shaft 5 is mounted in a self lubricating bearing 6 in the frame 7. A sixteen millimeter film sprocket 9 is mounted on one end of the shaft 5 adjacent the bearing 6, while a collar 10 fixed to the shaft 6 by a set screw 11 is adjacent the other end of the bearing. The shaft is driven from the main power supply by a chain on a sprocket 13. This sprocket has an internal square screw thread 14 cut in its bore and which meshes with an external square screw thread cut on the body of the shaft 5. Thus, with shaft 5 stationary and the sprocket 13 rotated in one direction, the sprocket moves to the left, and when rotated in the other direction, the sprocket will move toward the right axially of the shaft.

Mounted around the outer rim portions of the sides of the sprocket 13 are frictional clutch rings 15 and 16. The clutch ring 15 is adapted to contact a similar clutch ring 18 when the sprocket 13 moves to the left, the clutch ring 18 being on a small diameter pulley 19 mounted on a self lubricating bearing 20. A retaining ring 21 is mounted in a groove of the shaft 5 adjacent the bearing 20, while a self lubricating thrust bearing 22 is adjacent the other side of the pulley 19.

On the other side of the sprocket 13, is a larger diameter pulley 24 mounted on a self lubricating bearing 25 positioned against a retaining ring 26 on one side thereof and a thrust bearing 27 on the other side thereof. A friction ring 17 on one face of the hub of pulley 24 is adapted to be contacted by ring 16 on sprocket 13 when the latter is moved to the right. A collar 29 with a set screw 30 is mounted on the end of the shaft 5.

To advance the film for projection, the sprocket 13 is driven in a certain direction, such as indicated by the arrow on the sprocket 9. In this direction of rotation, the sprocket 13 moves to the left on the square thread 14 until the friction clutch collars 15 and 18 contact one another. At this point, the sprocket rotates the shaft 5 at a certain projection rate of speed for a film of a particular size, the invention being applicable to films of different sizes. Also, the pulley 19 is rotated, this pulley being belted to the take-up reel 8, and rotates at a speed great enough to take up the film on an empty reel. As the film roll diameter increases, slippage can occur between the friction rings 15 and 18 to vary the angular speed of the reel.

When it is desired to rewind the film on the supply reel 12, the motor is reversed and the sprocket 13 is rotated in the opposite direction. When so rotated, the sprocket 13 moves to the right so that the surfaces of friction rings 16 and 17 come into contact and the pulley 24 is driven, this pulley being belted to the supply reel 12. Since the speed of the shaft 5 is the same in both directions of rotation, but the pulley 24 has a large diameter compared with pulley 19, the rewind speed will be at a greater rate than the projection speed. As the film is advanced for projection, the rewind pulley 24 is permitted to rotate freely while the pulley 19 rotates freely when the pulley 24 is being driven for rewinding. Thus, the above described mechanism requires only the reversing of the motor to shift the drive from the take-up to the supply reel, the rewinding being at a greater speed than the projection speed.

I claim:

1. A drive mechanism for a film advancing sprocket, a take-up reel, and a supply reel comprising a shaft, a film advancing sprocket mounted at one end of said shaft, a constant speed drive sprocket for said shaft mounted thereon, said drive sprocket being threaded on said shaft so that rotation in one direction advances said drive sprocket axially along said shaft, and rotation of said drive sprocket in the opposite direction moves said drive sprocket axially along said shaft in the opposite direction, a first pulley having a certain diameter on one side of said drive sprocket for driving said take-up reel, a second pulley having a larger diameter than said first pulley and positioned on the other side of said drive sprocket, and contact means between said drive sprocket and said pulleys, rotation of said drive sprocket in one direction driving said first pulley and take-up reel to take up film at one certain speed and rotation of said drive sprocket in the other direction driving the other of said pulleys to take up film by said supply reel at a higher rate of speed determined by the differential in size between said pulleys.

2. A drive mechanism for a film advancing sprocket, a take-up reel, and a supply reel comprising a shaft, a film driving sprocket on said shaft, a constant speed shaft driving sprocket threaded on said shaft, a pulley of one diameter and positioned on one side of said shaft driving sprocket for driving said take-up reel at a certain speed, a second pulley having a larger diameter than said first pulley and positioned on the other side of said shaft driving sprocket for driving said supply reel when taking up film at a higher rate of speed than said take-up reel, one of said pulleys being contacted by said sprocket when said driving sprocket is rotated in one direction, and the other of said pulleys being contacted by said driving sprocket when said driving sprocket is rotated in the opposite direction.

3. A drive mechanism for advancing film, for taking up said film on a take-up reel during advancement at one certain rate of speed, and for rewinding said film after advancement at a higher rate of speed on a supply reel, comprising a shaft, a bearing for said shaft, a film advancing sprocket on one end of said shaft adjacent said bearing, means for preventing axial movement of said shaft in said bearing, screw threads on said shaft, means for rotating said shaft threaded on said screw threads, said shaft rotating means being adapted to be driven in opposite directions at the same speed, a pulley having a certain diameter and positioned intermediate said shaft rotating means and said first mentioned means for driving said take-up reel, said shaft rotating means being adapted to move axially along said shaft on said threads to contact said pulley when driven in one direction to rotate said pulley at a certain speed, and a second pulley having a larger diameter than said first pulley and positioned on the other side of said shaft rotating means for driving said supply reel, said shaft rotating means being adapted to move axially along said shaft on said threads to contact said second pulley when driven in the opposite direction.

4. A drive mechanism in accordance with claim 3, in which said first mentioned means is a collar adjacent said bearing, frictional clutch rings being provided on said shaft rotating means and on said pulleys which contact one another when said shaft rotating means is moved axially along said shaft in respective directions.

5. A drive mechanism in accordance with claim 3, in which said first mentioned means is a collar adjacent said bearing, and said shaft rotating means is a constant speed sprocket for rotating said shaft when brought into contact with either of said pulleys, said film advancing sprocket advancing film when said first mentioned pulley drives said take-up reel for taking up said film.

References Cited in the file of this patent

UNITED STATES PATENTS

| Number | Name | Date |
|---|---|---|
| 378,088 | Foote | Feb. 21, 1888 |
| 2,099,987 | Murdock | Nov. 23, 1937 |
| 2,212,617 | Otto | Aug. 27, 1940 |